US007010758B2

(12) United States Patent
Bate

(10) Patent No.: US 7,010,758 B2
(45) Date of Patent: Mar. 7, 2006

(54) DYNAMICALLY DEFINED CONTEXT SENSITIVE JUMP MENU

(75) Inventor: Clifton S. Bate, San Diego, CA (US)

(73) Assignee: Leap Wireless International, Inc., San Diego, CA (US)

( * ) Notice: Subject to any disclaimer, the term of this patent is extended or adjusted under 35 U.S.C. 154(b) by 479 days.

(21) Appl. No.: 09/893,629

(22) Filed: Jun. 29, 2001

(65) Prior Publication Data

US 2003/0007012 A1 Jan. 9, 2003

Related U.S. Application Data

(60) Provisional application No. 60/291,926, filed on May 21, 2001.

(51) Int. Cl.
 *G06F 3/00* (2006.01)
(52) U.S. Cl. ............... 715/841; 715/810; 715/864; 715/733
(58) Field of Classification Search ............... 345/777, 345/810, 841, 853, 864, 733, 776, 828, 829; 715/841
 See application file for complete search history.

(56) References Cited

U.S. PATENT DOCUMENTS

| 5,261,042 | A |   | 11/1993 | Brandt ................... 345/841 |
|---|---|---|---|---|
| 5,436,954 | A |   | 7/1995 | Nishiyama et al. ......... 455/566 |
| 5,666,502 | A |   | 9/1997 | Capps .................... 345/811 |
| 5,745,716 | A |   | 4/1998 | Tchao et al. ............. 345/777 |
| 5,848,396 | A |   | 12/1998 | Gerace |
| 5,852,775 | A |   | 12/1998 | Hidary |
| 5,854,630 | A | * | 12/1998 | Nielsen .................. 345/739 |
| 5,880,732 | A |   | 3/1999 | Tryding .................. 345/810 |
| 5,991,735 | A |   | 11/1999 | Gerace |
| 6,002,398 | A |   | 12/1999 | Wilson ................... 345/777 |
| 6,008,031 | A |   | 12/1999 | Modrich et al. ........... 435/200 |
| 6,018,342 | A |   | 1/2000 | Bristor .................. 345/840 |
| 6,037,941 | A |   | 3/2000 | Goto ..................... 345/777 |
| 6,050,898 | A |   | 4/2000 | Vange et al. |
| 6,055,510 | A |   | 4/2000 | Henrick et al. |
| 6,097,967 | A |   | 8/2000 | Hubbe et al. ............. 455/558 |
| 6,112,215 | A |   | 8/2000 | Kaply .................... 715/507 |
| 6,113,494 | A |   | 9/2000 | Lennert |
| 6,125,287 | A |   | 9/2000 | Cushman et al. .......... 455/566 |
| 6,134,532 | A |   | 10/2000 | Lazarus et al. |
| 6,144,380 | A | * | 11/2000 | Shwarts et al. ........... 345/863 |
| 6,157,841 | A |   | 12/2000 | Bolduc et al. |
| 6,181,927 | B1 |   | 1/2001 | Welling, Jr. et al. |
| 6,208,866 | B1 |   | 3/2001 | Rouhollahzadeh et al. |
| 6,216,129 | B1 |   | 4/2001 | Eldering |
| 6,223,291 | B1 |   | 4/2001 | Puhl et al. |

(Continued)

FOREIGN PATENT DOCUMENTS

EP  1066867 A2  1/2001

(Continued)

*Primary Examiner*—Kieu D. Vu
(74) *Attorney, Agent, or Firm*—Reed Smith LLP

(57) ABSTRACT

Selection of a jump menu option on a wireless communication device presents the user with a dynamically defined, context sensitive menu that provides access to each previously visited card in the current navigation session. Access is additionally provided to cards containing help menus, personalized menus, and user tips. Help and tips menus can be context sensitive. The jump menu may be accessed by selecting a menu choice, icon, or soft-key presented on the display of the wireless device.

24 Claims, 12 Drawing Sheets

U.S. PATENT DOCUMENTS

| | | |
|---|---|---|
| 6,501,956 B1 * | 12/2002 | Weeren et al. ............... 455/463 |
| 2001/0005839 A1 | 6/2001 | Maenpaa et al. |
| 2001/0011248 A1 | 8/2001 | Himmel et al. |
| 2001/0013037 A1 | 8/2001 | Matsumoto |
| 2001/0014911 A1 | 8/2001 | Doi et al. |

FOREIGN PATENT DOCUMENTS

| | | |
|---|---|---|
| EP | 1066868 A2 | 1/2001 |
| EP | 1086732 A1 | 3/2001 |
| EP | 1087323 A1 | 3/2001 |

* cited by examiner

DYNAMICALLY DEFINED CONTEXT SENSITIVE JUMP MENU

CROSS REFERENCE TO RELATED APPLICATION

The application relates to and claims priority on U.S. Provisional Patent Application Ser. No. 60/291,926 entitled "Dynamically Defined Context Sensitive Jump Menu," filed May 21, 2001.

FIELD OF THE INVENTION

The present invention relates to the field of wireless telephony and more particularly to the field of menu systems using a card and deck metaphor to facilitate navigation through screens of information on a wireless communication device.

BACKGROUND OF THE INVENTION

The advent of wireless personal communications devices has revolutionized the telecommunications industry. Cellular, personal communication services ("PCS"), and other services provide wireless personal communication to businesses and individuals at home, in the office, on the road, and at any other location the wireless network can reach. Wireless telephone subscribers no longer must use hard-wired public telephones along the road or wait until returning to the home or office to check messages or to return important business calls. Instead, wireless subscribers can carry out day-to-day business from the privacy of an automobile, from a remote job site, while walking along the airport concourse, and anywhere else that a personal communication signal is accessible.

Thus, it is no surprise that since the introduction of the cellular telephone service, the number of wireless telephone subscribers has increased steadily. Today, there are a staggering number of wireless telephone subscribers whose ranks are growing rapidly. In fact, many households have multiple wireless telephones in addition to their conventional land line services.

With a market of this size, there is fierce competition among hardware manufacturers and service providers. In an attempt to lure customers, most providers offer handsets with desirable features or attributes such as small size, light weight, long battery life, speed dial, and the like. Many recent additions to the marketplace include multi-functional handsets that even provide pocket organizer functions integrated into the wireless handset. Most manufacturers, however, are still scrambling to add new features to their wireless communication devices to share a portion of this booming market.

One way in which new features are added to wireless communication devices is by integrating the devices into the World Wide Web ("Web"). Such integration allows the countless services available through the Web to be extended to wireless communication devices. One such service allows a wireless device to connect to a Web server that provides desirable content from the Web such as stock quotes and sports scores. Additionally, services such as on-line shopping are also becoming widely available to wireless consumers.

Typically, the delivery of such content and services is achieved through a text based interface presented on the display of the wireless communication device. This type of interface is generally necessary to optimize the often meager resources of a wireless device. For example, wireless devices are challenged with their minimal display size, limited processing power, limited memory, limited ability to display complex graphics and colors, and limited bandwidth.

A significant drawback related to the minimal display size of a wireless communication device is encountered when large amounts of information need to be presented. Typically, the information is divided up into portions that can be simultaneously presented on the small display of the wireless device. This type of division requires the use of a considerable number of separate screens to present any large body of information. A single screen of information is typically referred to as a "card" while a "deck" usually refers to a collection of cards.

Furthermore, the selection of an option on each card in order to more narrowly define the scope of information being sought results in very inefficient navigation when incorrect choices are mistakenly selected. Interacting with a deck containing a large number of cards (each with several options and selections) can be extremely cumbersome and very confusing. Thus, these conventional systems can significantly limit the commercial advantages related to the wireless delivery of content and services. Accordingly, what is needed is a system and method that overcomes the significant problems of the conventional wireless card and deck navigational systems as described above.

OBJECTS OF THE INVENTION

It is therefore an object of the present invention to provide a system and method for displaying information organized in decks and cards on a wireless device.

It is another object of the present invention to provide a system and method for navigating through screens of information on a wireless device.

It is still another object of the present invention to provide a jump menu for directly navigating to selected cards in a deck of information.

It is yet another object of the present invention to provide a system and method of forming a jump menu including recently displayed cards.

It is still yet another object of the present invention to provide a jump menu including an indication of the level of separation between the different cards in the jump menu.

Additional objects and advantages of the invention are set forth, in part, in the descriptions which follows, and, in part, will be apparent to one of ordinary skill in the art from the description and/or from the practice of the invention.

SUMMARY OF THE INVENTION

The present invention provides a card containing a jump menu that allows the user of a wireless communication device to step back through a series of previously visited cards. The user can choose to backstep to the immediately preceding card or any interim card visited between (and including) the main card of the home deck and the current card. The jump menu also may provide access to help and tips that can be context sensitive.

The jump menu can be accessed by selecting a soft key presented on the display of the wireless communication device. Alternatively, the jump menu can be accessed by selecting a physical key (or button) on the wireless device. Once a soft key or button has been selected and the jump menu has been requested, the jump menu is dynamically created based on the current context of the card and deck navigational system. Advantageously, the jump menu contains an entry for each interim card between the current card and the main card of the home deck. The jump menu can also contain entries for certain predefined cards such as a personalized home menu and a help menu. The user can navigate to any interim or predefined card by selecting the appropriate entry on the jump menu.

Responsive to the foregoing challenges, Applicant has developed a method of providing a jump menu for directly navigating to selected cards in a deck, said method comprising the steps of: making a first deck having a plurality of cards available to the wireless communication device for display thereon; displaying a first card of the first deck on the wireless communication device; inputting a navigational request related to the first deck into the wireless communication device; displaying a second card of the first deck on the wireless communication device in response to the navigational request; inputting a jump menu navigational request into the wireless communication device; and displaying a jump menu on the wireless communication device in response to the jump menu navigational request, wherein the jump menu comprises menu items for directly navigating to at least two cards, and wherein at least one of said two cards is in said first deck.

Applicant has also developed an innovative method of providing a jump menu for navigating to selected cards in a deck, said method comprising the steps of: sending a plurality of requests for cards from the wireless communication device to the server computer; displaying the requested cards on the wireless communication device; storing the sequence of displayed cards in a memory associated with the server computer; sending a jump menu request from the wireless communication device to the server computer; and sending a jump menu from the server computer to the wireless communication device in response to the jump menu request, wherein the jump menu comprises menu items for directly navigating to selected ones of the stored sequence of displayed cards.

Applicant has also developed an innovative computer readable medium having stored thereon one or more sequences of instructions for causing one or more microprocessors to perform the steps for providing a jump menu to a wireless communication device, the steps comprising: receiving a wireless connection from the wireless communication device; providing a home deck to the wireless communication device; providing at least one card to the wireless communication device in response to a request for said at least one card; receiving a request from the wireless communication device for a jump menu; determining a current card, and a set of previously visited cards; creating the jump menu, the jump menu containing an entry for the home card, the current card, and each card in the set of previously visited cards; and providing the jump menu to the wireless communication device, the jump menu allowing direct access to each card represented by an entry in the jump menu.

Applicant has also developed an innovative computer system including a processor, a persistent storage area, a volatile storage area, and a communications means, the computer system configured to provide a jump menu to a wireless communication device, the computer system further including an execution area configures to perform the steps of: receiving a wireless connection from the wireless communication device; providing a home deck to the wireless communication device; providing at least one card to the wireless communication device in response to a request for said at least one card; receiving a request from the wireless communication device for a jump menu; determining a current card, and a set of previously visited cards; creating the jump menu, the jump menu containing an entry for the home deck, the current card, and each card in the set of previously visited cards; and providing the jump menu to the wireless communication device, the jump menu allowing direct access to each card represented by an entry in the jump menu.

It is to be understood that both the foregoing general description and the following detailed description are exemplary and explanatory only, and are not restrictive of the invention as claimed. The accompanying drawings, which are incorporated herein by reference and which constitute a part of this specification, illustrate certain embodiments of the invention, and together with the detailed description serve to explain the principles of the present invention.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION OF THE INVENTION

Certain embodiments as disclosed herein provide a method for presenting a dynamically defined jump menu over a wireless communication network to a wireless communication device. For example, one method as disclosed herein allows a server computer, upon request, to create a jump menu and present the jump menu on the display of a wireless communication device. The jump menu advantageously can contain an entry for each card previously provided to the wireless communication device in addition to entries for certain static cards such as a service home menu or a user home menu.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
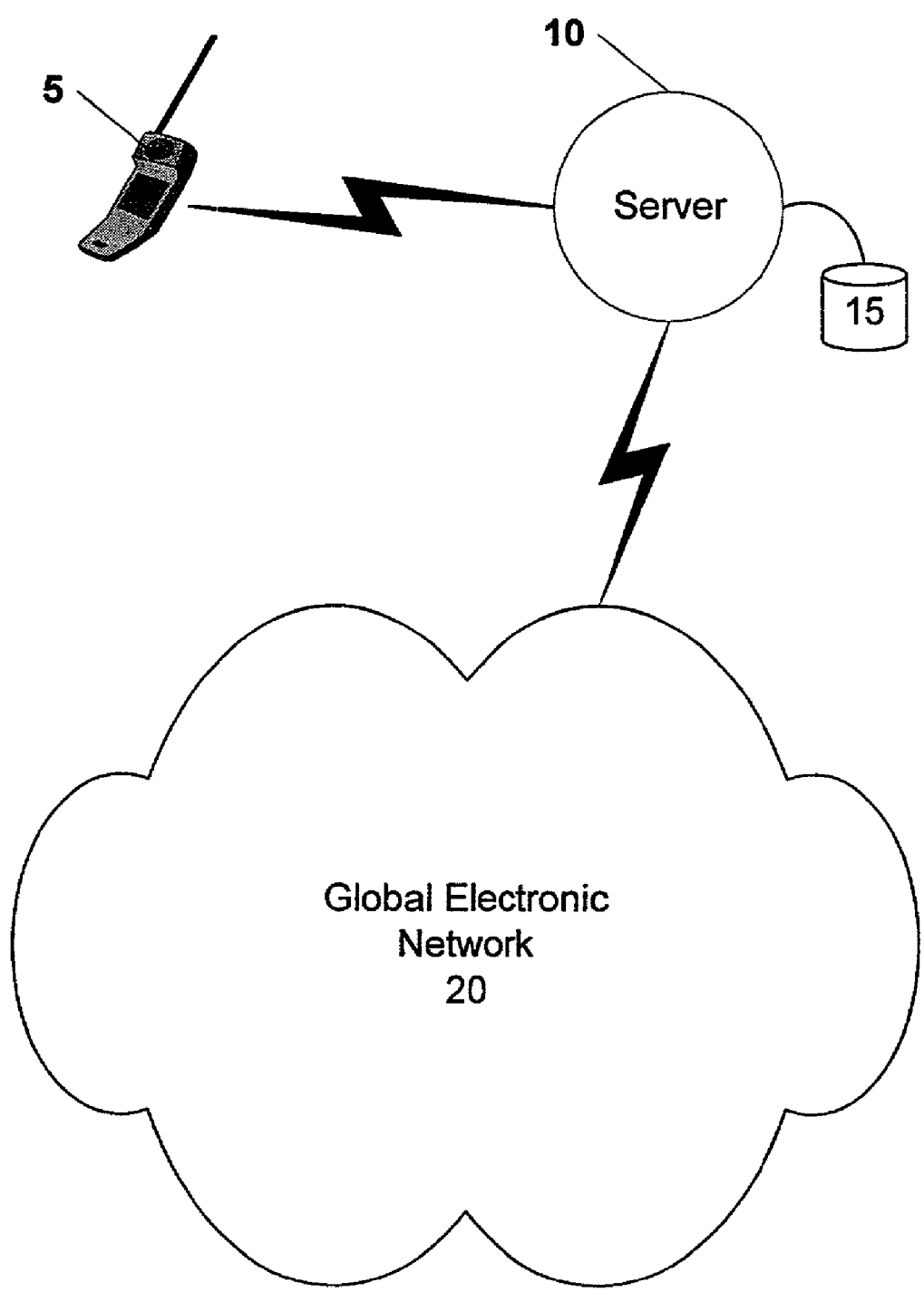
FIG. 1 is a top level block diagram illustrating an example overview architecture according to an embodiment of the present invention.

FIG. 1 is a top level block diagram illustrating an example overview architecture according to an embodiment of the present invention. Wireless communication device 5 is communicatively coupled with server 10 over a wireless communication network. Server 10 can be coupled with a database 15 that is optimally configured to store information pertaining to the metaphorical card and deck system for wireless data navigation in general and jump menus in particular. Database 15 may also be configured to store additional types of information.

Server 10 can also be connected to global electronic network 20. Global electronic network 20 can be a local area network ("LAN"), wide area network ("WAN"), an intranet, or a combination of networks such as the well known Internet. Server 10 can provide information and content to wireless device 5 that is stored in database 15. Server 10 can additionally provide information and content to wireless device 5 that originates from global electronic network 20.

Figure 1A:
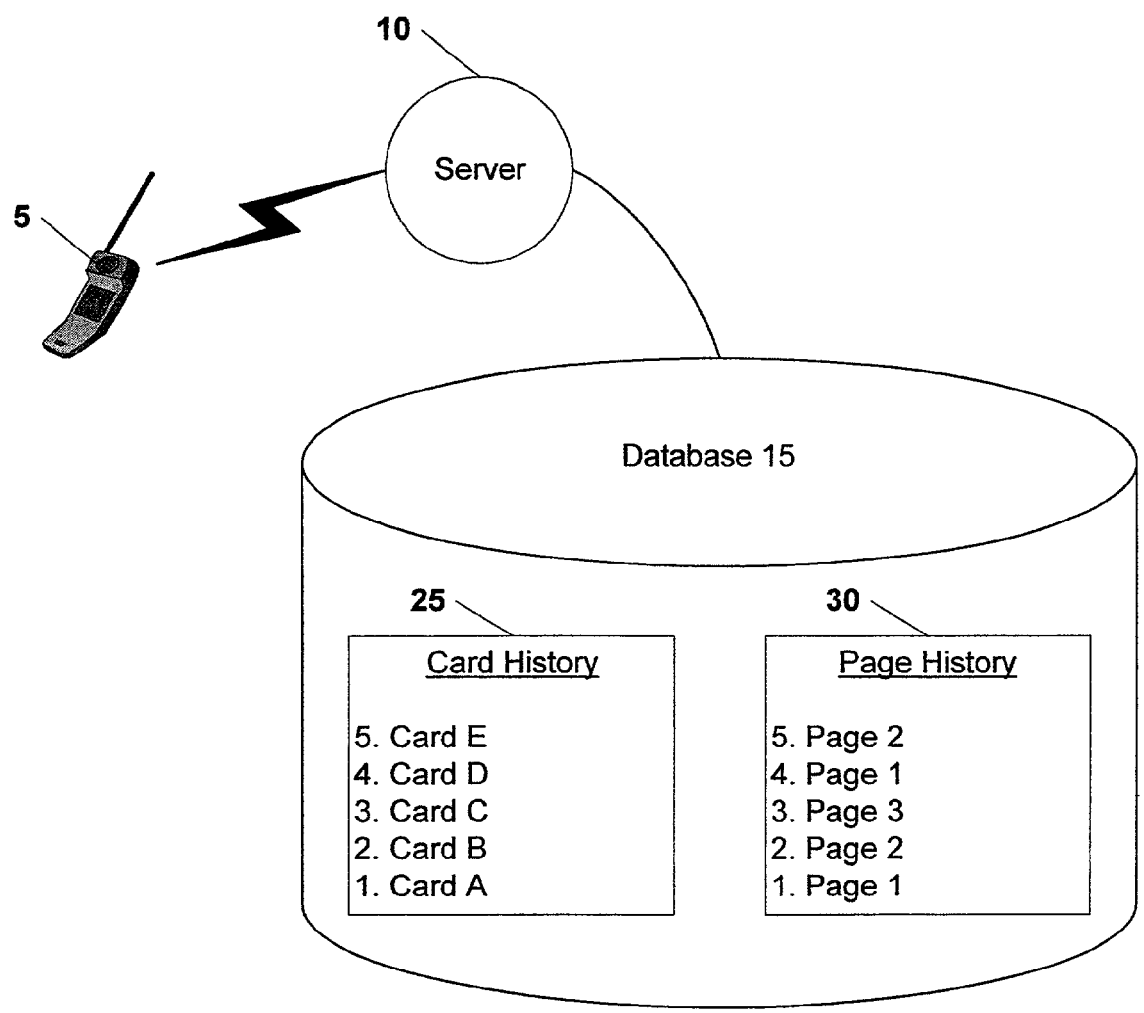
FIG. 1A is a block diagram illustrating an example system architecture according to an embodiment of the present invention.

FIG. 1A is a block diagram illustrating an example system architecture according to an embodiment of the present invention. Wireless device 5 is communicatively coupled with server 10 over a wireless communication network. Server 10 can be coupled with database 15 to store information pertaining to the metaphorical card and deck system for wireless data navigation. Additionally, database 15 can contain information pertaining to a jump menu that can be dynamically created when requested by a user of the wireless device.

For example, the database 15 can contain a card history 25 and a page history 30. In one embodiment, the card history 25 can store a chronological history of cards that have been displayed to the wireless device in the current session. Advantageously, the card history 25 can be a unique list of cards, maintained in chronological order. For example, when a user of the wireless device begins at a first card, requests a second card, navigates back to the first card, once again selects the second card, and finally requests a third card, a purely chronological card history 25 would contain:

| |
|---|
| Third card |
| Second card |
| First card |
| Second card |
| First card | in that order. However, a unique card history 25 would advantageously contain:

| |
|---|
| Third card |
| Second card |
| First card | which eliminates the duplicate entries for the first and second cards.

The page history 30 may contain entries that correspond to the entries in the card history 25. For example, certain cards in the card and deck system may contain more than one full screen of information. In such a case, a single card in the card history 25 may be comprised of two or more pages. Advantageously, the current contextual page for each card in the card history 25 can be stored in the page history 30.

According to the example card history 25 and page history 30 presented in FIG. 1A, the contextual page associated with card A is page 1. Similarly, the contextual page associated with card B is page 2. Furthermore, the contextual page associated with card C is page 3, the contextual page associated with card D is page 1, and the contextual page associated with card E is page 2. Advantageously, the contextual page association stored in page history 30 allows certain features of the jump menu to provide a precise backward navigation within the card and deck navigational system for the wireless device.

Figure 2:
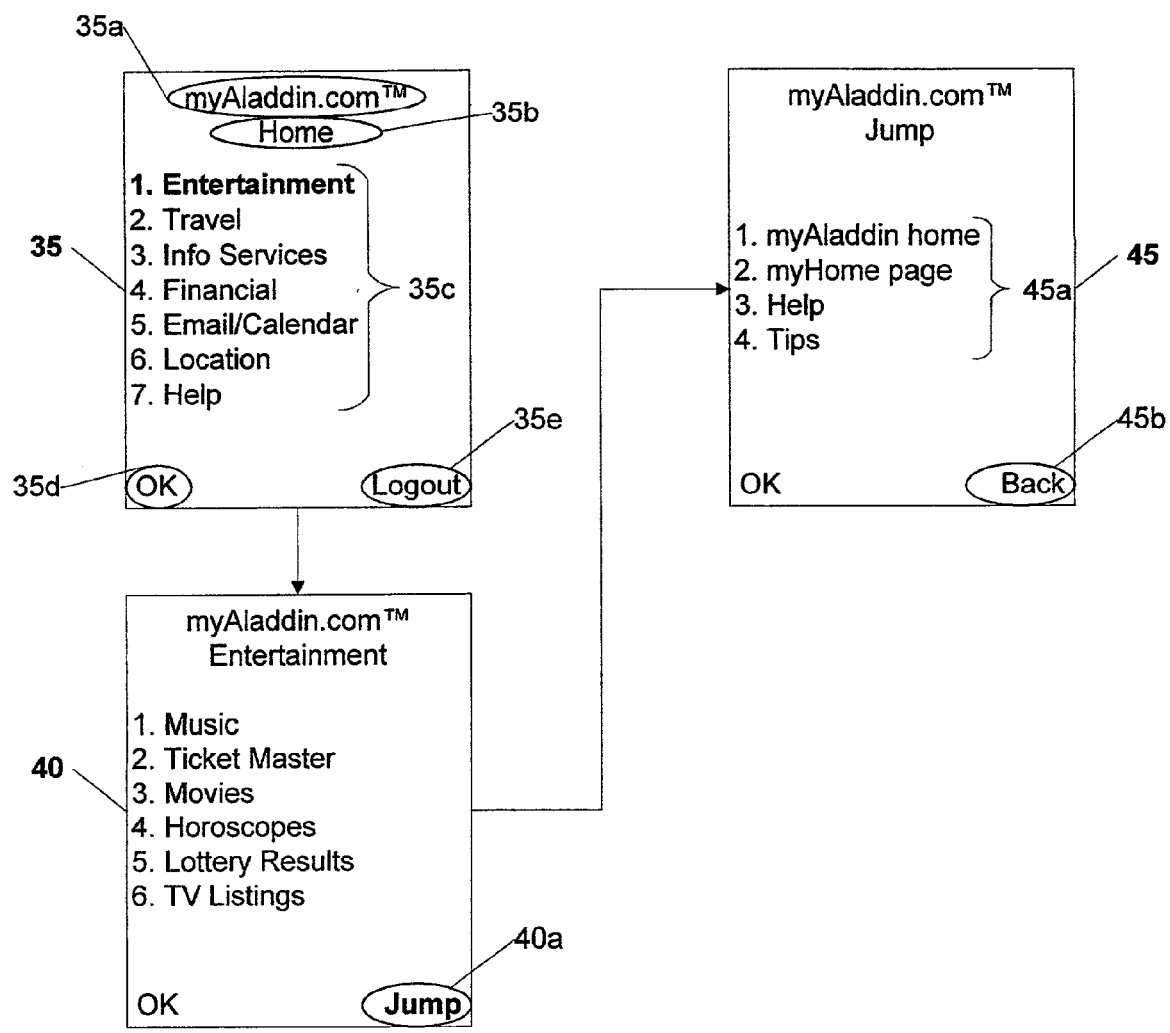
FIG. 2 is a series of example screen shots illustrating a sequence of user interface screens for presenting a dynamically defined context sensitive jump menu according to an embodiment of the present invention.

FIG. 2 is a series of example screen shots illustrating a sequence of user interface screens for presenting a dynamically defined context sensitive jump menu according to an embodiment of the present invention. Home deck 35 represents a typical deck for the card and deck system provided to a wireless communication device. The invention should not be limited to a deck that starts with a "home" card, however it is likely that most decks will include a home card as the first card in the deck.

Each card in the deck may be configured such that the top of the screen presents header information about the particular card being displayed. In one embodiment, service 35a and current card 35b can be displayed as header information. For example, service 35a can be the popular MyAladdin-.com™ service, while current card 35b can be the home deck.

Additionally, each card in the deck may be configured to present a list 35c in the main portion of the screen. Typically, the list 35c contains the services, options, or selections that are available to the user of the wireless device. The list 35c can be presented as a numbered list, a lettered list, or some other type of ordered list. The services, options, or selections may also be presented as a simple list, a bulleted list, or an alphabetically ordered list. Preferably, the list 35c is conspicuously presented on the main portion of the display of the wireless device.

Furthermore, each card in the deck may also employ the use of soft keys 35d and 35e to help in navigation and provide flexibility in the interface. A soft key is a programmable option that is presented on the display of the wireless device. Although the soft key typically corresponds to a particular button on the wireless device, the label for the soft key may be changed based on the context of the particular card.

In one embodiment, the label applied to a soft key can advantageously be modified to reflect the current function of the soft key. For example, soft key 35*d* may be labeled with "OK" to allow for selection of an item in list 35*c* by scrolling to highlight the desired selection and pressing soft key 35*d*. Alternatively, soft key 35*e* may be labeled with "Logout" to allow a user to disconnect from the data navigation service. Additional labels for soft keys can include "Back" and "Jump" or any other desirable indicator of the current function associated with the soft key.

In one embodiment, several selections for different services or options are available through the list 35*c* on the home deck 35. For example, selections for services such as entertainment, travel, information services, financial services, email and calendar functions, location and mapping services, and help, may be presented. Additional desirable services and functions may also be presented as part of the list 35*c*.

Typically, a user of the wireless device selects an option from list 35*c* by pressing the number associated with the desired selection. Alternatively, a user can select an option by highlighting the desired item in list 35*c* and pressing the "OK" soft key, as previously described. Additional methods for selecting a menu item are also available and well known in the art.

Once the user has selected an option from list 35*c*, the corresponding new card is displayed. For example, if the user selects the first entry from list 35*c*, entertainment menu 40 will be displayed. Entertainment menu 40 is a sub-card of home deck 35 and may contain a list of more specific options and services. For example, options that may be available from a sub-card such as entertainment menu 40 can be music, movies, horoscopes, lottery results, and TV listings, to name just a few.

Additionally, entertainment menu 40 can have soft keys that correspond to functions that are directly related to the context of entertainment menu 40. For example, soft key 40*a* is labeled "Jump" and can provide the user of the wireless device access to a dynamically defined, context sensitive jump menu. The jump menu can be accessed by pressing soft key 40*a* that is associated with the jump menu. Alternatively, the jump menu can be accessed by pressing a hard key menu item associated with the jump menu (not shown). For example, certain wireless communication devices may not be sophisticated enough to display a soft key so that access to the jump menu is provided through the normal menu interface for that device.

Once the user has pressed soft key 40*a*, jump menu 45 is presented on the display of the wireless device. The title of the card may be presented in the card header information, as previously described with reference to home deck 35. A list 45*a* of options and selections may also be presented in the main portion of the card. In one embodiment, the list 45*a* may contain static entries relating to predefined menus, services, or functions. Additionally, the list 45*a* may also contain dynamically defined entries related to certain cards previously visited during the current wireless data navigation session.

For example, list 45*a* may contain static entries for home deck 35, which is associated with the service being used, such as myAladdin.com. The list 45*a* may also contain a static entry for a home card selected by or preferred by the user, such as myHome page. Furthermore, the list 45*a* may contain static entries for helpful services such as a Help menu or a Tips menu. In an alternative embodiment, the list 45*a* may include a selection labeled "Back" (not shown) to provide direct access to the immediately preceding card.

The jump menu 45 may also employ the use of various soft keys, such as soft key 45*b*. In one embodiment, soft key 45*b* can be labeled "Back" and provide direct access to the specific card or sub-card that immediately preceded jump menu 45. For example, pressing soft key 45*b* from jump menu 45 would present entertainment menu 40 on the display of the wireless device.

Figure 3:
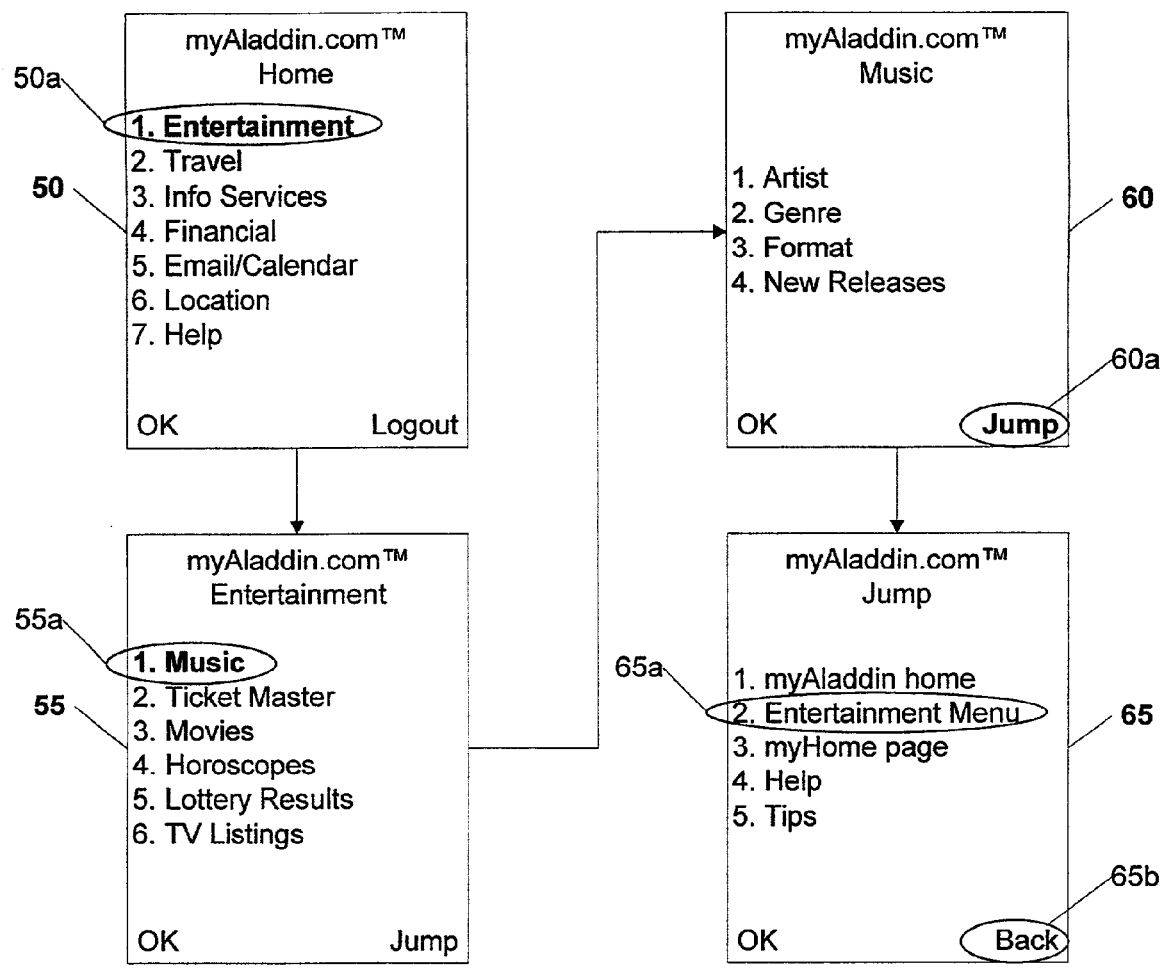
FIG. 3 is a series of example screen shots illustrating a sequence of user interface screens for presenting a dynamically defined context sensitive jump menu according to an embodiment of the present invention.

FIG. 3 is a series of example screen shots illustrating a sequence of user interface screens for presenting a dynamically defined context sensitive jump menu according to an embodiment of the present invention. The first card is home deck 50 where the user of a wireless device would typically begin a data browsing session. Home deck 50 has several selections for various services or options provided by the myAladdin.com service. Choosing option 50*a* allows the user to browse toward more specific options and services in the entertainment area.

Once the user has selected option 50*a*, entertainment menu 55 is presented to the user on the display of the wireless device. Entertainment menu 55 similarly has a list of options and services that provide access to more specific areas of interest related to entertainment. For example, option 55*a* is focused on the music aspects of the entertainment field. Selection of option 55*a* allows the user to browse toward more specific options and services in the music area.

Once the user has selected option 55*a*, music menu 60 is presented to the user on the display of the wireless device. Music menu 60 also has a list of options and services that provide access to more granular areas of interest related to music and entertainment. Additionally, music menu 60 has soft key 60*a* labeled "Jump" that allows the user to access a dynamically defined, context sensitive jump menu.

Selection of soft key 60*a* causes the wireless device to present jump menu 65 on the display of the wireless device. Additionally, the title of jump menu 65 may be presented in the card header information, as previously described with reference to FIG. 2. A list of options and selections can also be presented in the main portion of jump menu 65. In one embodiment, the list of options and selections may contain static entries relating to predefined card, services, or functions. Moreover, the list of options and selections can also contain dynamically defined entries related to certain cards previously visited during the current wireless data navigation session.

For example, the list of options and services may contain a dynamic entry 65*a* for entertainment menu 55. The entry is dynamic because its inclusion in the jump menu 65 can be based on a previous visit to the particular entertainment menu 55 during the current wireless data navigation session. Preferably, selection of dynamic entry 65*a* by the user will result in entertainment menu 55 being presented on the display of the wireless device.

The jump menu 65 may also employ the use of various soft keys, such as soft key 65*b*. In one embodiment, soft key 65*b* can be labeled "Back" and provide direct access to the specific card or sub-card that immediately preceded jump menu 65. For example, pressing soft key 65*b* from jump menu 65 would ultimately result in music menu 60 being presented on the display of the wireless device.

Figure 4:
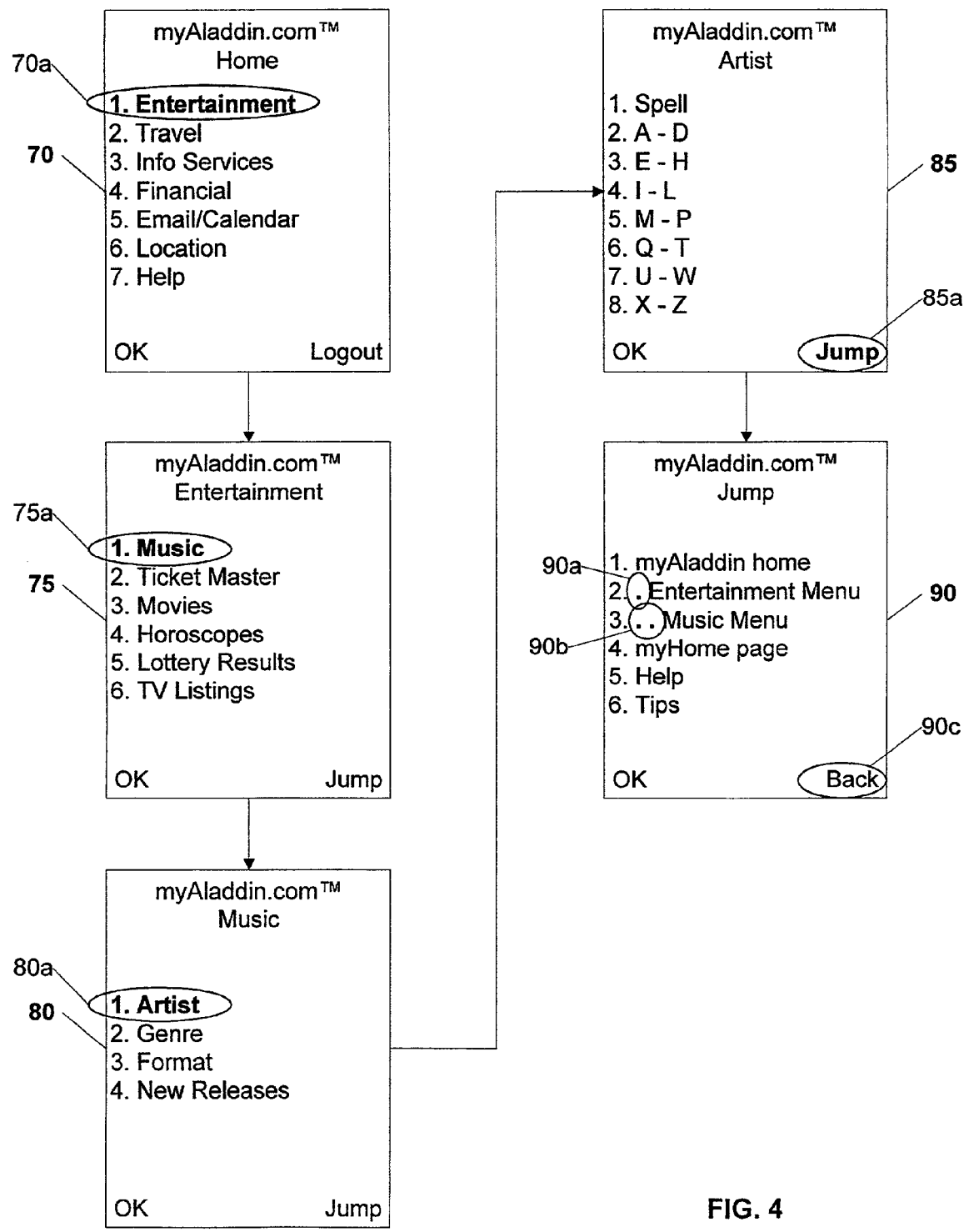
FIG. 4 is a series of example screen shots illustrating a sequence of user interface screens for presenting a dynamically defined context sensitive jump menu according to an embodiment of the present invention.

FIG. 4 is a series of example screen shots illustrating a sequence of user interface screens for presenting a dynamically defined context sensitive jump menu according to an embodiment of the present invention. The first card is home deck 70 where the user of a wireless device would typically begin a data browsing session. Home deck 70 has several selections for various services and choosing option 70a allows the user to browse toward more specific options and services in the entertainment area.

Once the user has selected option 70a, entertainment menu 75 is presented to the user on the display of the wireless device. Entertainment menu 75 similarly has a list of options and services that provide access to more specific areas of interest related to entertainment. For example, option 75a is focused on the music aspects of the entertainment field. Selection of option 75a allows the user to browse toward more specific options and services in the music area.

Once the user has selected option 75a, music menu 80 is presented to the user on the display of the wireless device. Music menu 80 also has a list of options and services that provide access to more granular areas of interest related to music and entertainment. For example, option 80a provides a more granular view of music related products, services, and information broken down by artist. Selection of option 80a allows the user to access more specific artist related options and services in the music area.

Once the user has selected option 80a, artist menu 85 is presented to the user on the display of the wireless device. Artist menu 85 also has a list of options and services that provide access to more granular areas of interest related to music and entertainment. Additionally, artist menu 85 has soft key 85a labeled "Jump" that allows the user to access a dynamically defined, context sensitive jump menu.

Selection of soft key 85a causes the wireless device to present jump menu 90 on the display of the wireless device. Additionally, the title of jump menu 90 may be presented in the card header information, as previously described with reference to FIG. 2. A list of options and selections can also be presented in the main portion of jump menu 90. In one embodiment, the list of options and selections may contain static entries relating to predefined cards, services, or functions. Moreover, the list of options and selections can also contain dynamically defined entries related to certain cards previously visited during the current wireless data navigation session.

For example, the list of options and services may contain dynamic entries that are associated with particular cards previously visited by the user in the current wireless data navigation session. In one embodiment, dynamic entries in jump menu 90 may be identified by the presence of level indicators 90a and 90b. Moreover, level indicators 90a and 90b may indicate how many levels the particular menu entry is removed from the home deck 70. For example, level indicator 90a is comprised of a single dot, indicating that the entertainment menu 75 is one level removed from the home deck 70. Additionally, level indicator 90b is comprised of two dots, indicating that the music menu 80 is two levels removed from the home deck 70.

In an alternative embodiment, level indicators 90a and 90b may indicate the number of levels removed from the jump menu 90. In such a case, level indicator 90a may be comprised of three dots, indicating that the entertainment menu 75 is three levels removed from jump menu 90. Similarly, level indicator 90b may be comprised of two dots, indicating that the music menu 80 is two levels removed from jump menu 90.

The jump menu 90 may also employ the use of various soft keys, such as soft key 90c. In one embodiment, soft key 90c can be labeled "Back" and provide direct access to the specific card or sub-card that immediately preceded jump menu 90. For example, pressing soft key 90c from jump menu 90 would ultimately result in artist menu 85 being presented on the display of the wireless device.

Figure 5:
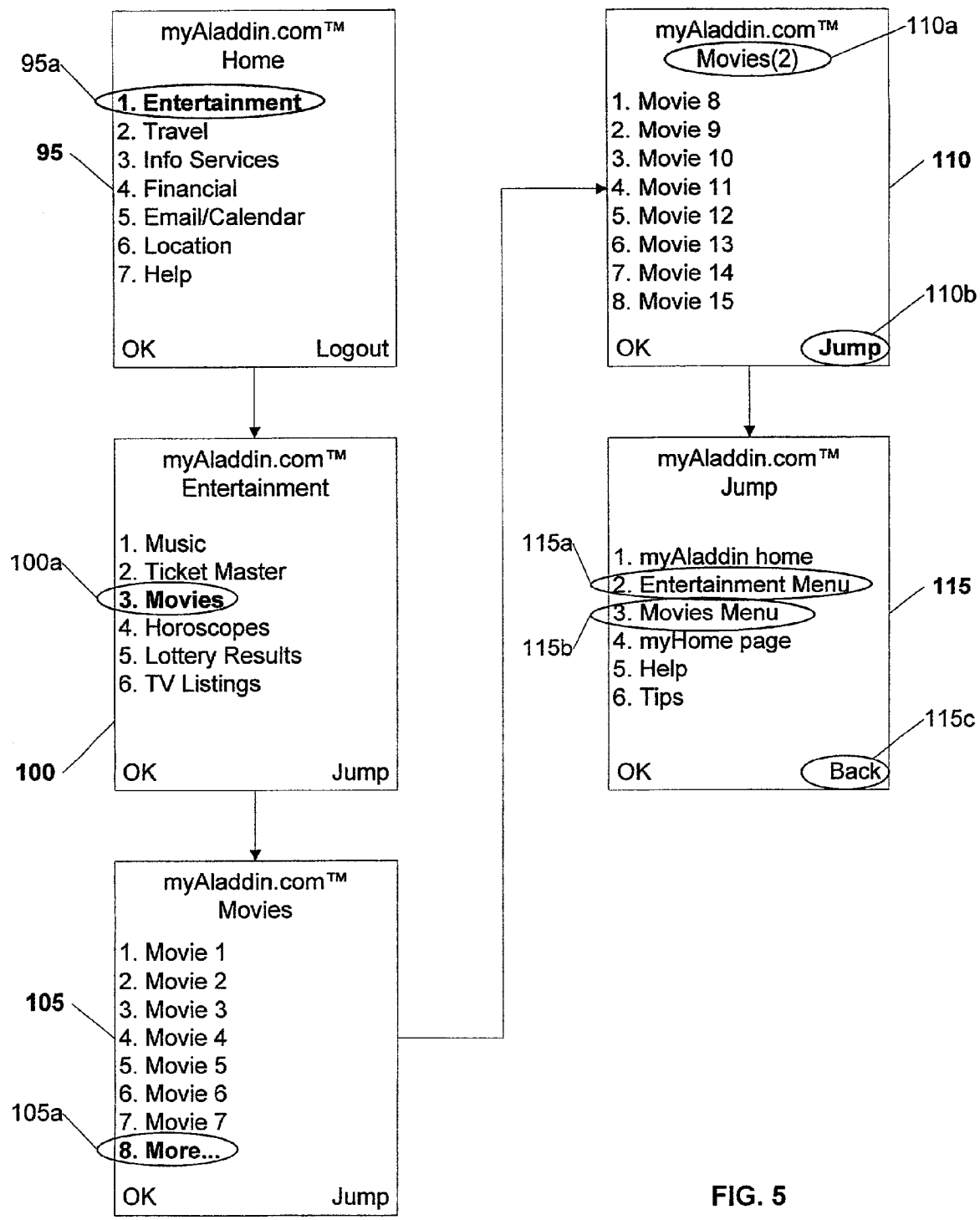
FIG. 5 is a series of example screen shots illustrating a sequence of user interface screens for presenting a dynamically defined context sensitive jump menu according to an embodiment of the present invention.

FIG. 5 is a series of example screen shots illustrating a sequence of user interface screens for presenting a dynamically defined context sensitive jump menu according to an embodiment of the present invention. The first card is home deck 95 where the user of a wireless device would typically begin a data browsing session. Home deck 95 has several selections for various services and choosing option 95a allows the user to browse toward more specific options and services in the entertainment area.

Once the user has selected option 95a, entertainment menu 100 is presented to the user on the display of the wireless device. Entertainment menu 100 similarly has a list of options and services that provide access to more specific areas of interest related to entertainment. For example, option 100a is focused on the movies aspect of the entertainment field. Selection of option 100a allows the user to browse toward more specific options and services related to movies.

Once the user has selected option 100a, movies menu 105 is presented to the user on the display of the wireless device. Movies menu 105 may also have a list of options and services that provide access to more granular areas of interest related to movies and entertainment. For example, available options on movies menu 105 may provide information relating to the location and playing time of a particular movie. Alternatively, option 105a may provided access to additional information that is part of the movies sub-category. Selection of option 105a allows the user to access the additional information related to the movies sub-category.

Once the user has selected option 105a, movies(2) menu 110 is presented to the user on the display of the wireless device. In one embodiment, a subsequent page associated with a particular card may be so described by the current card 110a identifier in the header section of the card. Movies(2) menu 110 may also have a list of options and services that provide access to more granular areas of interest related to movies. Additionally, movies(2) menu 110 can have a soft key 110b labeled "Jump" that allows the user to access a dynamically defined, context sensitive jump menu.

Selection of soft key 110b causes the wireless device to present jump menu 115 on the display of the wireless device. Additionally, the title of jump menu 115 may be presented in the card header information, as previously described with reference to FIG. 2. A list of options and selections can also be presented in the main portion of jump menu 115. In one embodiment, the list of options and selections may contain static entries relating to predefined card, services, or functions. Moreover, the list of options and selections can also contain dynamically defined entries related to certain cards previously visited during the current wireless data navigation session.

For example, the list of options and services may contain dynamic entries that are associated with particular cards previously visited by the user in the current wireless data navigation session. In one embodiment, dynamic entries 115a and 115b are included in jump menu 115 because the user previously visited entertainment menu 100 and movies menu 105 during the current wireless data navigation session. Preferably, selection of dynamic entry 115a by the user will result in entertainment menu 100 being presented on the display of the wireless device. Furthermore, selection of dynamic entry 115b by the user will preferably result in movies menu 105 being presented on the display of the wireless device.

The jump menu 115 may also employ the use of various soft keys, such as soft key 115c. In one embodiment, soft key 115c can be labeled "Back" and provide direct access to the specific card or sub-card that immediately preceded jump menu 115. For example, pressing soft key 115c from jump menu 115 would result in movies(2) menu 110 being presented on the display of the wireless device. Advantageously, the context of the movies card, ie. Page 2, may be integrated into the "Back" soft key such that the user returns to the precise page of the previous card rather than to the first page of the previous card.

Figure 6:
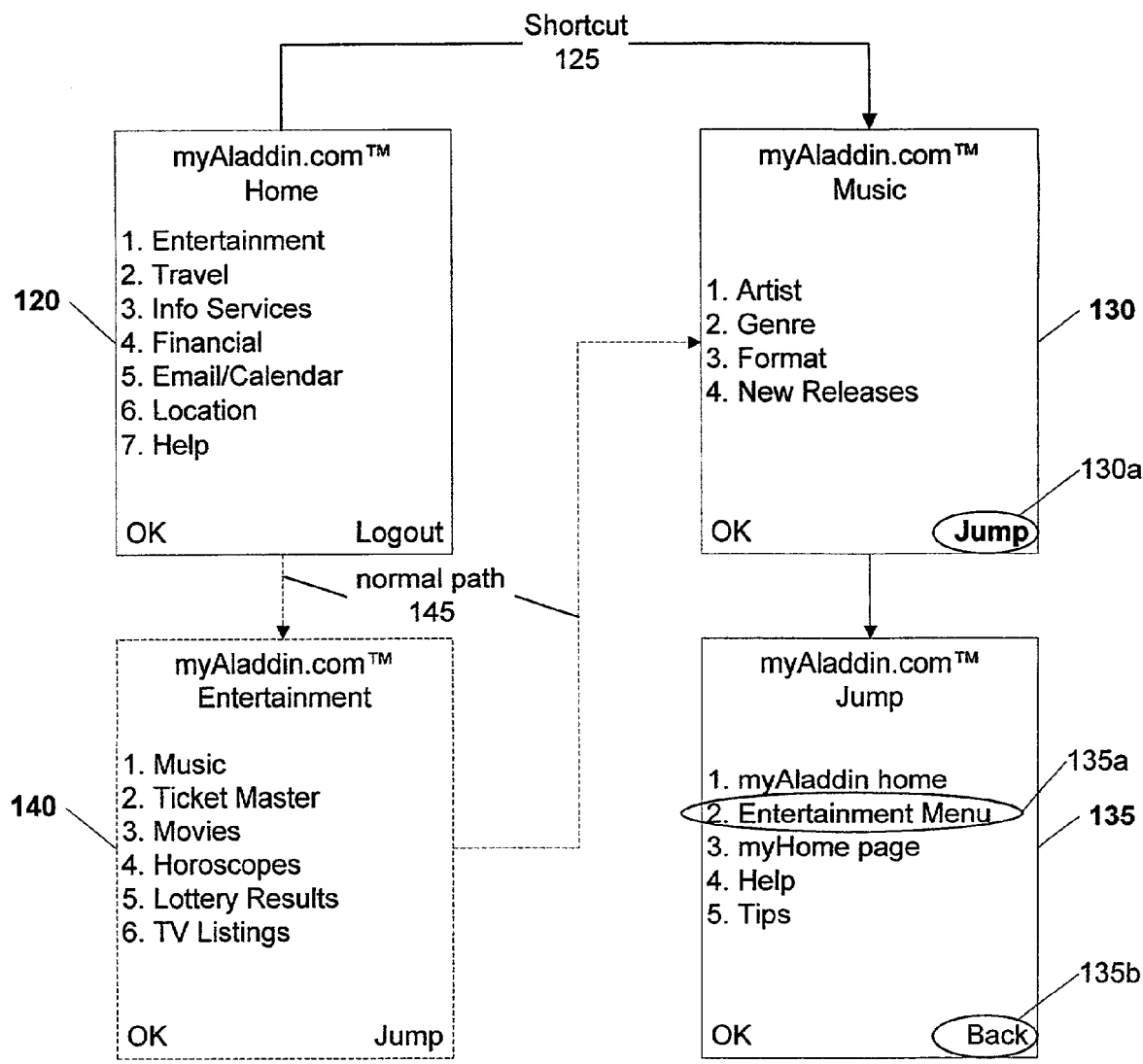
FIG. 6 is a series of example screen shots illustrating a sequence of user interface screens for presenting a dynamically defined context sensitive jump menu according to an embodiment of the present invention.

FIG. 6 is a series of example screen shots illustrating a sequence of user interface screens for presenting a dynamically defined context sensitive jump menu according to an embodiment of the present invention. The first card is home deck 120 where the user of a wireless device would typically begin a data browsing session. Home deck 120 has several selections for various services or options. In addition to the various services and options presented on home deck 120, there may also be certain keys, combinations, or otherwise, that allow the user to directly access a sub-card. For example, there may be a shortcut 125 that provides direct access to the music menu 130.

Once the user has selected shortcut 125, music menu 130 is presented to the user on the display of the wireless device. Music menu 130 may have a list of options and services that provide access to more granular areas of interest related to music. Additionally, music menu 130 may have a soft key 130a labeled "Jump" that allows the user to access a dynamically defined, context sensitive jump menu.

Selection of soft key 130a causes the wireless device to present jump menu 135 on the display of the wireless device. A list of options and selections containing static entries relating to predefined cards, services, or functions and dynamic entries relating to cards previously visited during the wireless data navigation session can advantageously be presented in the main portion of jump menu 135.

For example, the list of options and services may contain a dynamic entry 135a for entertainment menu 140. Inclusion of a dynamic entry in the jump menu 135 can be based on a previous visit to the particular card during the current wireless data navigation session. Alternatively, inclusion of a dynamic entry in the jump menu 135 can be based on a cards presence in the normal path 145 between home deck 120 and the card immediately preceding jump menu 135. In other words, a dynamic entry may be included in jump menu 135 based on a cards presence in the most direct route from the card immediately preceding the jump menu 135 back to the home deck 120.

For example, although entertainment menu 140 was not visited during the wireless navigation session (due to the use of shortcut 125), the most direct route between music menu 130 (the card immediately preceding jump menu 135) and the home deck 120 travels through the entertainment menu 140. Alternatively stated, the normal path 145 between home deck 120 and music menu 130 includes entertainment menu 140. Dynamic entry 135a associated with entertainment menu 140 may thus be included in the jump menu 135.

The jump menu 135 may also employ the use of various soft keys, such as soft key 135b. In one embodiment, soft key 135b can be labeled "Back" and provide direct access to the specific card or sub-card that immediately preceded jump menu 135. For example, pressing soft key 135b from jump menu 135 would ultimately result in music menu 130 being presented on the display of the wireless device.

Figure 7:
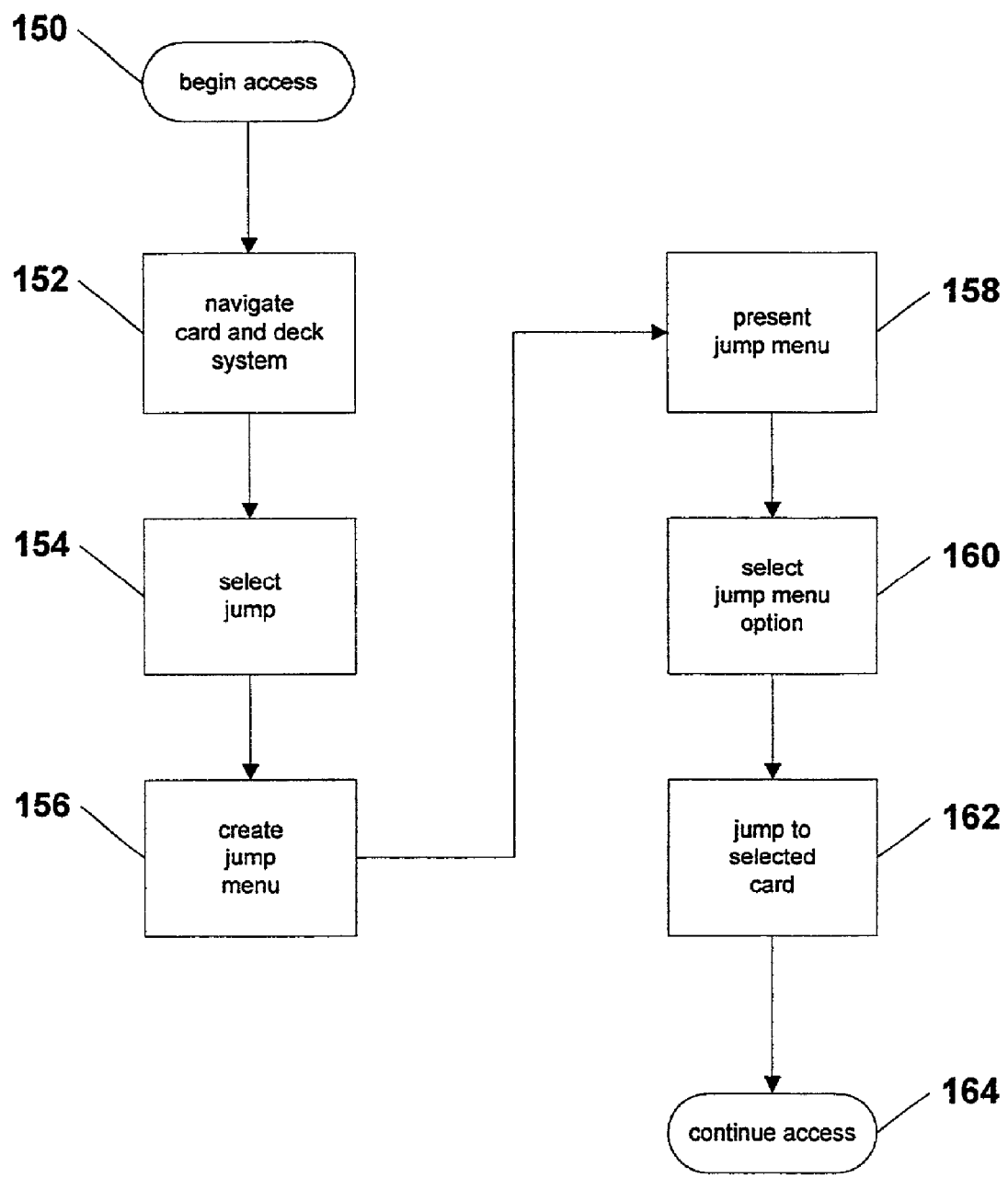
FIG. 7 is a flowchart illustrating an example process for providing a dynamically defined context sensitive jump menu to a wireless device according to an embodiment of the present invention.

FIG. 7 is a flowchart illustrating an example process for providing a dynamically defined context sensitive jump menu to a wireless device according to an embodiment of the present invention. In step 150 a user begins access to a wireless data navigation session. This may be accomplished by connecting to a server computer with a wireless communication device. Once access has been achieved, the user may then navigate through the card and deck system presented on the wireless communication device by the server, as illustrated in step 152.

Navigation through the series of cards comprising the deck may be controlled by depressing certain keys or buttons on the wireless device. In one embodiment, navigation may be effectuated by providing oral commands to the wireless device. At some point during the navigation step, the user may select an option to view the jump menu, as shown in step 154. The jump menu option may be selected by selecting a menu item, giving an oral command, or selecting a soft key. Various other methods for selecting the jump menu may also be employed.

Once the jump menu has been requested by the user, the server computer creates the jump menu, as illustrated in step 156. The jump menu may advantageously contain each card previously visited by the user during the wireless data navigation session. Alternatively, the jump menu may contain a unique list of each card previously visited by the user during the wireless data navigation session. The jump menu may also contain certain static card entries for helpful access to frequently requested information or locations. For example, a static card entry for the home page may be included in the jump menu in addition to a static card entry for a help menu.

Once the jump menu has been created, the jump menu is presented to the user on the display of the wireless communication device, as seen in step 158. As described above, the jump menu may be comprised of static and dynamic entries. The jump menu may also include soft keys, a title, and other relevant information. The user, upon receiving the jump menu, may select an option presented by the jump menu, as shown in step 160.

For example, the user may select an option by choosing a particular menu item, by pressing a soft key, by highlighting the desired option and pressing a soft key or other designated combination of keys. Once the user has made a selection, the server presents a card containing the selected information on the display of the wireless device, as illustrated in step 162. The selected information may be presented in the form of a menu or some alternative form that provides an optimal configuration for the delivery of the information or options. At this point, the user may continue the wireless data navigation session, as seen in step 164.

Figure 8:
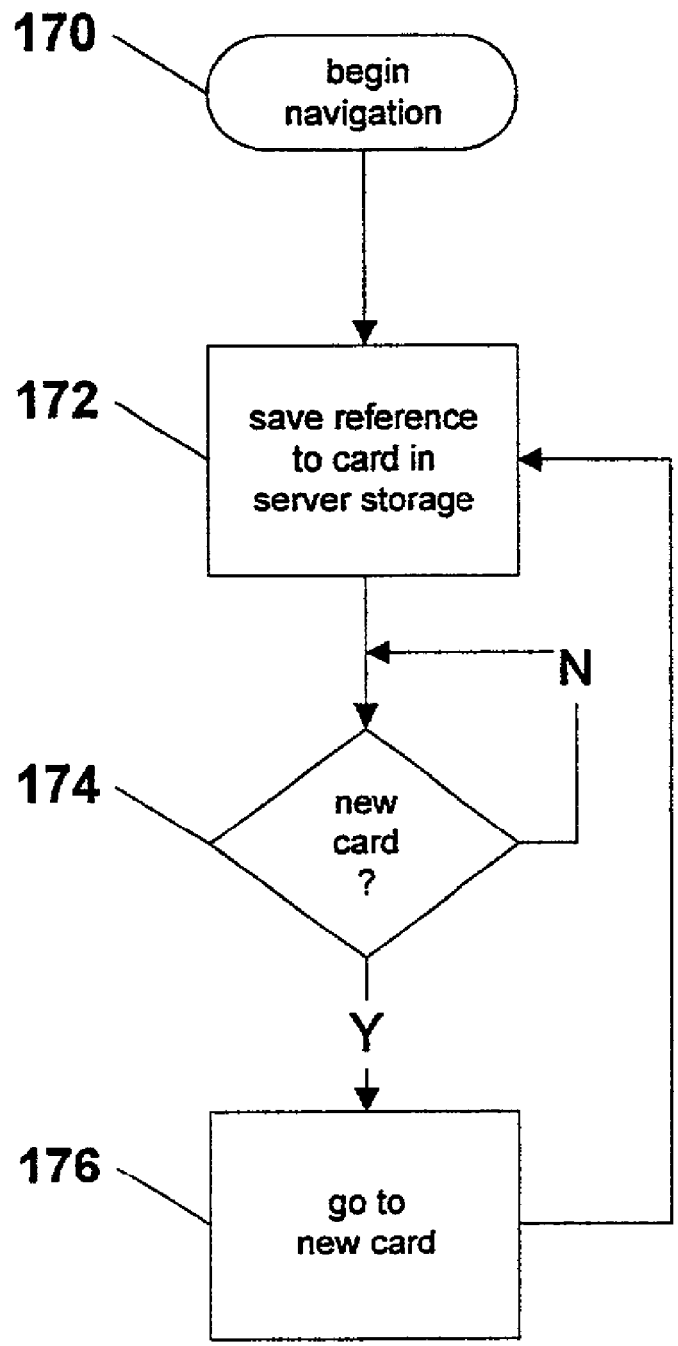
FIG. 8 is a flowchart illustrating an example process for providing a dynamically defined context sensitive jump menu to a wireless device according to an embodiment of the present invention.

FIG. 8 is a flowchart illustrating an example process for providing a dynamically defined context sensitive jump menu to a wireless device according to an embodiment of the present invention. In step 170 a user begins navigation through the card and deck system of a wireless data navigation session. In step 172, the server computer controlling the session saves a reference to the current card in a server storage area. For example, a reference to the first card provided to the user as part of the wireless data navigation session is stored in a server storage area associated with the particular user.

When the user requests a new card, as illustrated in step 174, or requests additional information that requires an additional page for the current card, the server provides the new card to the wireless device in step 176 and loops back to step 172 to save a reference to the new card in a server storage area associated with the particular user. By storing a reference to each card and each page of each card that is visited by the user, the server may keep an accurate record of the current session for the particular user. Advantageously, this accurate record may allow the server computer to reconstruct the context of the session in order to create a jump menu with a unique list of cards visited by the user in the current session.

In an alternative embodiment, the server system may store predetermined jump menus based on its knowledge of the static card and deck navigational system. In such an embodiment, the server may provide a correctly constructed jump menu based on the context of the card and deck navigational system from which the jump menu was requested. However, this alternative may be difficult to implement in a card and deck navigational system that provides inter-deck access.

Figure 9:
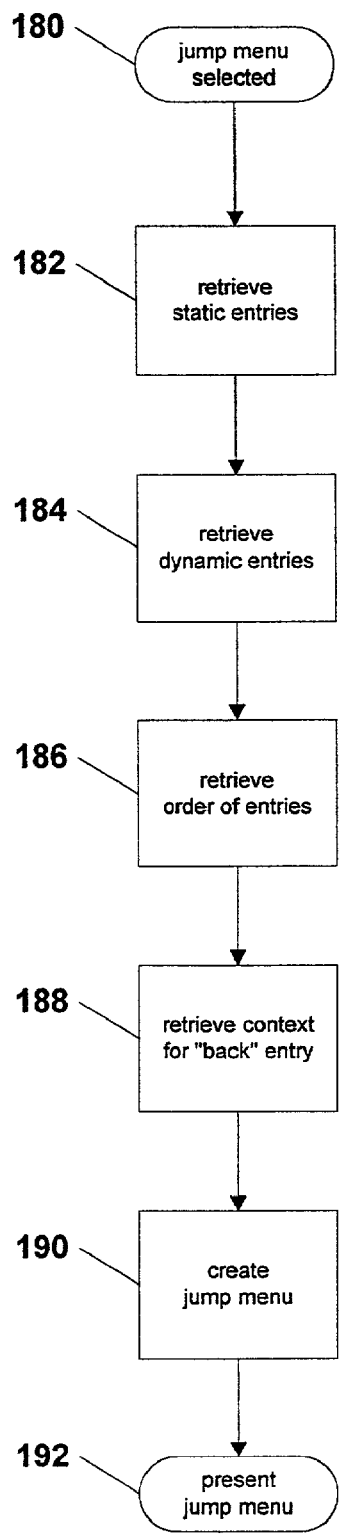
FIG. 9 is a flowchart illustrating an example process for providing a dynamically defined context sensitive jump menu to a wireless device according to an embodiment of the present invention.

FIG. 9 is a flowchart illustrating an example process for providing a dynamically defined context sensitive jump menu to a wireless device according to an embodiment of the present invention. In step 180 a user requests the jump menu. As discussed above, this request may be provided by the user in various ways. Once the server computer receives the user's request for the jump menu, the server may retrieve each of the static entries for inclusion in the jump menu, as illustrated in step 182. For example, a set of card entries may be predefined for inclusion in each jump menu presented to a user. In one embodiment, a set of static card entries may include an entry for the home deck, an entry for the user's preferred deck, an entry for a help card, and an entry for navigation tips.

Once the server has retrieved the static entries, the server may then retrieve the dynamic entries. These dynamic entries may advantageously be stored in a server storage area, as described above with reference to FIG. 1A and FIG. 8. In one embodiment, the server may need to filter the dynamic entries retrieved from the server storage area in order to verify that a unique set of dynamic entries are provided in the jump menu. Alternatively, the server may manage the server storage area such that only those unique entries are saved in the server storage area.

Once the static and dynamic entries have been retrieved, the server may retrieve information pertaining to the order the static and dynamic entries, as shown in step 186. For example, the static entries may be all presented at the beginning of the jump menu, placing the dynamic entries at the end of the jump menu. Alternatively, the static entries may be presented at the end of the jump menu, placing the dynamic entries at the beginning of the jump menu. In one embodiment, one or more static entries may be presented at the beginning of the jump menu, the dynamic entries may be presented in the middle of the jump menu, and the rest of the static entries may be presented at the end of the jump menu.

In step 188, the server may retrieve the particular context to be associated with the soft keys. In one embodiment a "Back" selection is provided in one of the soft keys. The context associated with the back selection may advantageously allow the soft key to provide access to a second, third, or other subsequent page of a particular card as described above with reference to FIG. 5. For example, an entry on the jump menu providing access to the movies card may provide direct access to the first page of the movies card. Alternatively, the context sensitive back selection may provide direct access to the second, third, or other subsequent page on the same movies card.

Once the static, and dynamic entries have been retrieved and ordered and the context for the soft keys has been determined, the jump menu can be created, as illustrated in step 190. Creation of the jump menu may include providing header information such as the service name and the title of the card. The jump menu may also include a list of items, conspicuously presented in the main portion of the jump menu. Furthermore, the jump menu may include certain programmable soft keys that provide additional, customizable functionality to the jump menu.

Once the jump menu has been created, the jump menu can be presented to the user on the display of the wireless device, as shown in step 192. Advantageously, the jump menu may be optimized for presentation in a single page, or single screen full for the particular device. In one embodiment, the header information may be removed in order to provide additional space for the presentation of the list of items. Furthermore, the static entries may also be removed to provide the space necessary to fit the list of dynamic entries on a single page or single screen full for the particular wireless device.

Figure 10:
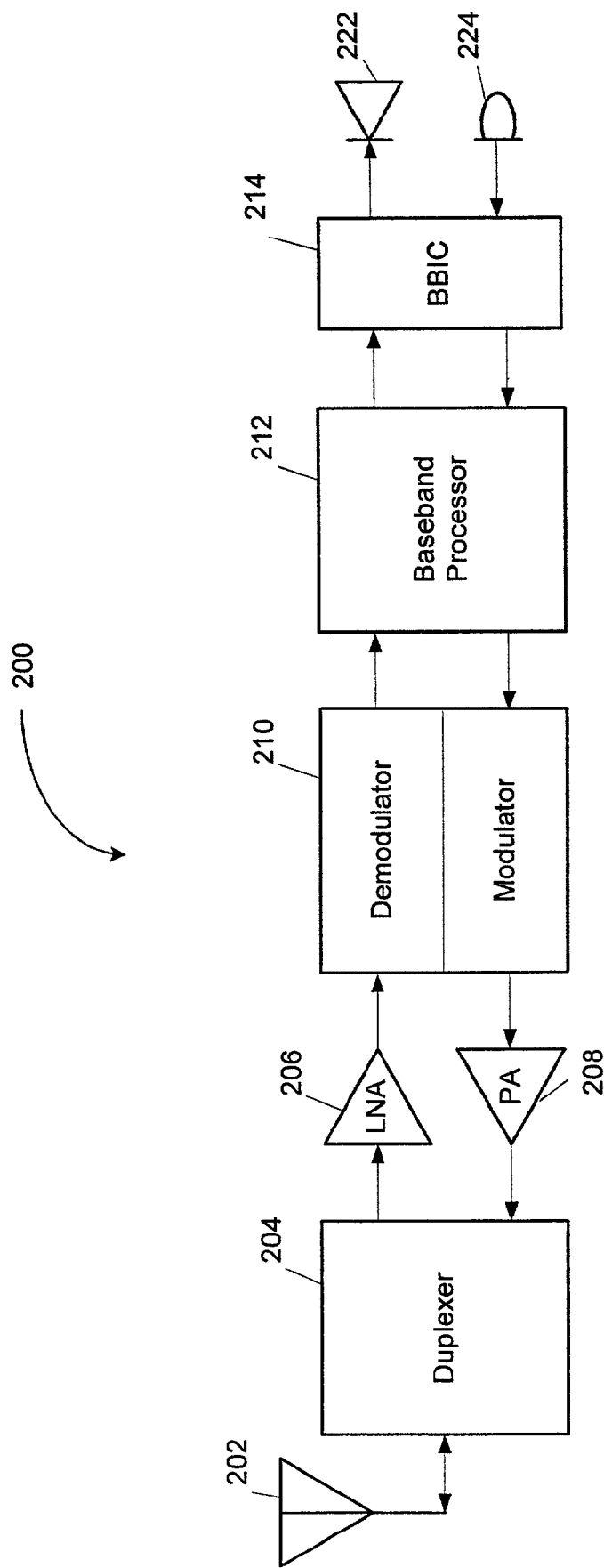
FIG. 10 is a block diagram illustrating an exemplary wireless communications device as may be used in connection with various embodiments described herein.

FIG. 10 is a block diagram illustrating an exemplary wireless communication device 200 which may be used in connection with various embodiments described herein. Wireless communication device 200 may include a baseband audio integrated circuit ("BBIC") 214 in accordance with the invention. In device 200, radio frequency ("RF") signals are transmitted and received by antenna 202. Duplexer 204 acts as a switch, coupling antenna 202 between transmit and receive signal paths. In the receive path, received RF signals are coupled from a duplexer 204 to Low Noise Amplifier ("LNA") 206. LNA 206 amplifies the received RF signal and couples the amplified signal to a demodulation portion of a modulation circuit 210.

Typically modulation circuit 210 will combine a demodulator and modulator in one integrated circuit ("IC"). The demodulator and modulator can, of course, be separate components. The demodulator strips away the RF carrier leaving a base-band receive audio signal, which is coupled from the demodulator output to base-band processor ("BBP") 212.

If the base-band receive audio signal contains audio information, then BBP 212 routes the signal to BBIC 214, where it is decoded, converted to an analog signal, amplified, and sent to speaker 222. BBIC 214 also receives analog audio signals from microphone 224, which are converted to digital signals encoded and routed to BBP 212. BBP 212 codes the digital signals for transmission and generates a base-band transmit audio signal that is routed to the modulation portion of modulation circuit 210. The modulator mixes the base-band transmit audio signal with an RF carrier generating an RF transmit signal that is routed to power amplifier ("PA") 208. PA 208 amplifies the RF transmit signal and routes it to duplexer 204. Duplexer 204 switches the RF transmit signal over to the duplexer 204 antenna port so that it can be transmitted by antenna 702.

Figure 11:
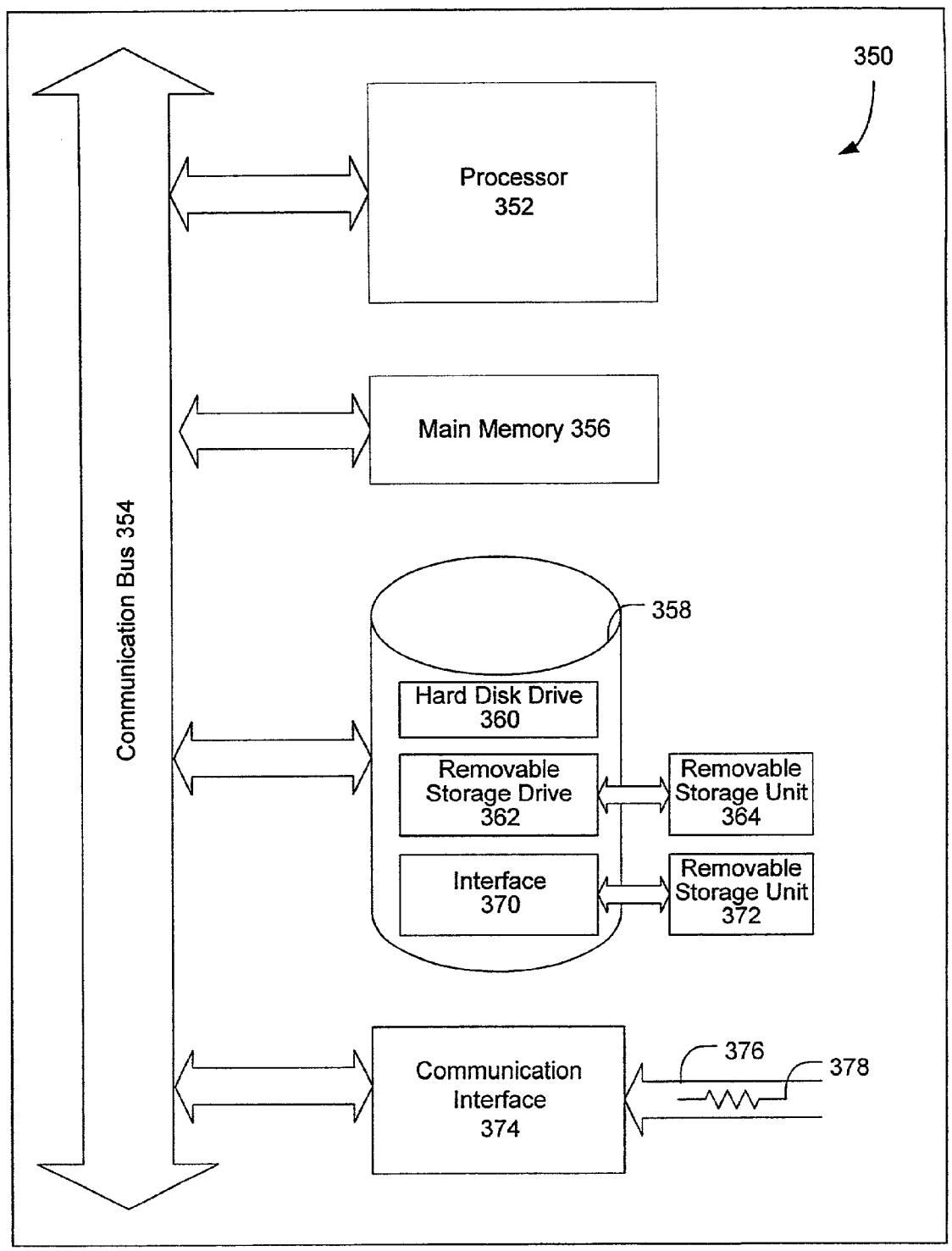
FIG. 11 is a block diagram illustrating an exemplary computer system as may be used in connection with various embodiments described herein.

FIG. 11 is a block diagram illustrating an exemplary computer system 350 which may be used in connection with various embodiments described herein. For example, the computer system 350 may be used to run a mobile switching center, or to provide connectivity, data storage, and other features useful for operating a wireless communications network (not shown). However, other computer systems and/or architectures may be used, as will be clear to those skilled in the art.

The computer system 350 preferably includes one or more processors, such as processor 352. Additional processors may be provided, such as an auxiliary processor to manage input/output, an auxiliary processor to perform floating point mathematical operations, a special-purpose microprocessor having an architecture suitable for fast execution of signal processing algorithms ("digital signal processor"), a slave processor subordinate to the main processing system ("back-end processor"), an additional microprocessor or controller for dual or multiple processor systems, or a coprocessor. Such auxiliary processors may be discrete processors or may be integrated with the processor 352.

The processor 352 is preferably connected to a communication bus 354. The communication bus 354 may include a data channel for facilitating information transfer between storage and other peripheral components of the computer system 350. The communication bus 354 further may provide a set of signals used for communication with the processor 352, including a data bus, address bus, and control bus (not shown). The communication bus 354 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

Computer system 350 preferably includes a main memory 356 and may also include a secondary memory 358. The main memory 356 provides storage of instructions and data for programs executing on the processor 352. The main memory 356 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, as well as read only memory (ROM).

The secondary memory 358 may optionally include a hard disk drive 360 and/or a removable storage drive 362, for example a floppy disk drive, a magnetic tape drive, an optical disk drive, etc. The removable storage drive 362 reads from and/or writes to a removable storage unit 364 in a well-known manner. Removable storage unit 364 may be, for example, a floppy disk, magnetic tape, optical disk, etc. which is read by and/or written to by removable storage drive 362. The removable storage unit 364 includes a computer usable storage medium having stored therein computer software and/or data.

In alternative embodiments, secondary memory 358 may include other similar means for allowing computer programs or other instructions to be loaded into the computer system 350. Such means may include, for example, a removable storage unit 372 and an interface 370. Examples of secondary memory 358 may include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage units 372 and interfaces 370, which allow software and data to be transferred from the removable storage unit 372 to the computer system 350.

Computer system 350 may also include a communication interface 374. The communication interface 374 allows software and data to be transferred between computer system 350 and external devices, networks or information sources. Examples of some types of components that might comprise communication interface 374 include a modem, a network interface (such as an Ethernet card), a communications port, a PCMCIA slot and card, and an infrared interface, to name a few. Communication interface 374 preferably implements industry promulgated protocol standards, such as Ethernet IEEE 802 standards, Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement non-standard interface protocols as well. Software and data transferred via communication interface 374 are generally in the form of signals 378 which may be electronic, electromagnetic, optical or other signals capable of being received by communication interface 374. These signals 378 are provided to communication interface 374 via a channel 376. This channel 376 carries signals 378 and can be implemented using wire or cable, fiber optics, a phone line, a cellular phone link, a radio frequency (RF) link, or other communications channels.

Computer programming instructions (i.e., computer programs or software) are stored in the main memory 356 and/or the secondary memory 358. Computer programs can also be received via communication interface 374. Such computer programs, when executed, enable the computer system 350 to perform the features relating to the present invention as discussed herein.

In this document, the term "computer program product" is used to refer to any media used to provide programming instructions to the computer system 350. Examples of these media include removable storage units 364 and 372, a hard disk installed in hard disk drive 360, and signals 378. These computer program products are means for providing programming instructions to the computer system 350.

In an embodiment that is implemented using software, the software may be stored in a computer program product and loaded into computer system 350 using hard drive 360, removable storage drive 362, interface 370 or communication interface 374. The software, when executed by the processor 352, may cause the processor 352 to perform the features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will be apparent to those skilled in the relevant art. Various embodiments may also be implemented using a combination of both hardware and software.

While the particular dynamically defined context sensitive jump menu herein shown and described in detail is fully capable of attaining the above described objects of this invention, it is to be understood that the description and drawings represent the presently preferred embodiment of the invention and are, as such, a representative of the subject matter which is broadly contemplated by the present invention. It is further understood that the scope of the present invention fully encompasses other embodiments that may become obvious to those skilled in the art, and that the scope of the present invention is accordingly limited by nothing other than the appended claims.

What is claimed is:

1. In a wireless communication system utilizing a method of displaying information organized in decks and cards on a wireless communication device, a method providing a jump menu for directly navigating to selected cards in a deck, said method comprising the steps of:

making a first deck having a plurality of cards available to the wireless communication device for display thereon;

displaying a first card of the first deck on the wireless communication device;

inputting a navigational request related to the first deck into the wireless communication device;

displaying a second card of the first deck on the wireless communication device in response to the navigational request;

inputting a jump menu navigational request into the wireless communication device;

displaying a jump menu on the wireless communication device in response to the jump menu navigational request, wherein the step of displaying the jump menu comprises the steps of:

sending the jump menu navigational request from the wireless communication device to a server computer located in the wireless communication system;

accessing a server computer memory to identify cards in the first deck previously displayed on the wireless communication device;

providing menu items in the jump menu corresponding to selected ones of the previously displayed cards in the first deck;

sending the jump menu from the server computer to the wireless communication device for display thereon;

wherein the jump menu comprises menu items for directly navigating to at least two cards, and wherein at least one of said two cards is in said first deck and wherein at least one of said two cards is in a second deck; and wherein the jump menu comprises a first set of menu items corresponding to recently displayed cards and a second set of menu items corresponding to cards preselected for inclusion in every jump menu.

2. The method of claim 1 wherein the step of making a first deck having a plurality of cards available comprises the steps of:

sending a request for the first deck from the wireless communication device to the server computer; and sending the first card in the first deck from the server computer to the wireless communication device in response to the request for the first deck.

3. The method of claim 1 wherein the selected ones of the previously displayed cards at least include two cards most recently displayed on the wireless communication device.

4. The method of claim 3 wherein a level of separation from a most recently displayed card is indicated in the jump menu for each menu item included therein.

5. The method of claim 1 wherein a home menu item is provided in every jump menu.

6. The method of claim 5 wherein a level of separation from the home menu is indicated in the jump menu for each menu item included therein.

7. The method of claim 1 wherein the selected ones of the previously displayed cards at least include a second most recently displayed card and exclude a most recently displayed card.

8. The method of claim 1 wherein the jump menu includes menu items corresponding to a set of cards in the first deck that link a most recently displayed card to the first card.

9. The method of claim 1 wherein the step of displaying the jump menu comprises the steps of:

determining a most recently displayed card on the wireless communication device;

accessing the server computer memory to identify menu items for the jump menu based on the determination of the most recently displayed card on the wireless communication device; and sending the jump menu from the server computer to the wireless communication device for display thereon.

10. The method of claim 9 wherein the step of making a first deck having a plurality of cards available comprises the steps of:

sending a request for the first deck from the wireless communication device to the server computer; and sending the first card in the first deck from the server computer to the wireless communication device in response to the request for the first deck.

11. The method of claim 9 wherein the menu items for the jump menu at least include menu items for two cards most recently displayed on the wireless communication device.

12. The method of claim 9 wherein a home menu item is provided in every jump menu.

13. The method of claim 12 wherein a level of separation from the home menu item is indicated in the jump menu for each menu item included therein.

14. The method of claim 9 wherein a level of separation from a most recently displayed card is indicated in the jump menu for each menu item included therein.

15. The method of claim 9 wherein the menu items identified for the jump menu at least include a second most recently displayed card and exclude a most recently displayed card.

16. The method of claim 9 wherein the jump menu includes menu items corresponding to a set of cards in the first deck that link a most recently displayed card to the first card.

17. The method of claim 1 wherein the jump menu excludes a menu item for a most recently displayed card on the wireless communication device.

18. In a wireless communication system having a wireless communication device linked to a server computer, and wherein information provided to the wireless communication device is organized in decks and cards, and wherein the wireless communication device is adapted to provide a menu interface for a user, a method of providing a jump menu for navigating to selected cards in a deck, said method comprising the steps of:

sending a plurality of requests for cards from the wireless communication device to the server computer;

displaying the requested cards on the wireless communication device;

storing the sequence of displayed cards in a memory associated with the server computer;

sending a jump menu request from the wireless communication device to the server computer;

sending a jump menu from the server computer to the wireless communication device in response to the jump menu request, wherein the jump menu comprises menu items for directly navigating to selected ones of the stored sequence of displayed cards;

wherein the jump menu comprises menu items for directly navigating to at least two cards, and wherein at least one of said two cards is in a first deck and wherein at least one of said two cards is in a second deck; and wherein the jump menu comprises a first set of menu items corresponding to recently displayed cards and a second set of menu items corresponding to cards pre-selected for inclusion in every jump menu.

19. The method of claim 18 wherein the selected ones of the stored sequence of displayed cards at least include two cards most recently displayed on the wireless communication device.

20. The method of claim 19 wherein a level of separation from a most recently displayed card is indicated in the jump menu for each menu item included therein.

21. The method of claim 18 wherein a home menu item is provided in every jump menu.

22. The method of claim 21 wherein a level of separation from the home menu item is indicated in the jump menu for each menu item included therein.

23. The method of claim 18 wherein the selected ones of the stored sequence of displayed cards at least include a second most recently displayed card and exclude a most recently displayed card.

24. The method of claim 18 wherein the jump menu includes menu items corresponding to a set of cards that link a most recently displayed card to a first displayed card.

* * * * *